United States Patent
Wakabayashi et al.

(10) Patent No.: US 11,402,731 B2
(45) Date of Patent: Aug. 2, 2022

(54) MICROLENS ARRAY SUBSTRATE, LIGHT MODULATOR, AND PROJECTOR

(71) Applicant: SEIKO EPSON CORPORATION, Tokyo (JP)

(72) Inventors: Junichi Wakabayashi, Ueda (JP); Akihide Haruyama, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 97 days.

(21) Appl. No.: 17/084,808

(22) Filed: Oct. 30, 2020

(65) Prior Publication Data
US 2021/0173289 A1 Jun. 10, 2021

(30) Foreign Application Priority Data
Oct. 31, 2019 (JP) .............................. JP2019-198834

(51) Int. Cl.
| | | |
|---|---|---|
| *G09G 3/30* | (2006.01) | |
| *G03B 21/00* | (2006.01) | |
| *G03B 21/14* | (2006.01) | |
| *G02F 1/1335* | (2006.01) | |
| *G09G 3/00* | (2006.01) | |
| *H04N 9/31* | (2006.01) | |

(52) U.S. Cl.
CPC ..... *G03B 21/006* (2013.01); *G02F 1/133526* (2013.01); *G03B 21/142* (2013.01); *G09G 3/007* (2013.01); *H04N 9/312* (2013.01)

(58) Field of Classification Search
CPC ............. G03B 21/006; G03B 21/142; G02F 1/133526; G02F 1/1313; G09G 3/007; G09G 3/002; G09G 5/391; G09G 5/399; G09G 2310/0224; G09G 2310/0278; G09G 2320/0242; G09G 5/04; H04N 9/312; H04N 9/3105; H04N 9/3188; G02B 3/0068
See application file for complete search history.

(56) References Cited

U.S. PATENT DOCUMENTS

| | | | |
|---|---|---|---|
| 2007/0216827 A1* | 9/2007 | Okada | ............... G02F 1/133526 349/62 |
| 2015/0092277 A1 | 4/2015 | Ozawa | |
| 2018/0143490 A1* | 5/2018 | Wakabayashi | ....... G02B 3/0056 |

FOREIGN PATENT DOCUMENTS

JP 2015-069187 4/2015

* cited by examiner

*Primary Examiner* — Adam R. Giesy
(74) *Attorney, Agent, or Firm* — Dority & Manning, P.A.

(57) ABSTRACT

A microlens array substrate includes a substrate having a first surface and a plurality of recesses corresponding to a plurality of pixels, and a microlens array including a plurality of microlenses corresponding to the plurality of recesses. The microlenses each have a refractive index different from a refractive index of the substrate, and each have a light incident surface and a light exiting surface. The light incident surface has a first curvature region and a second curvature region. The second curvature region surrounds the first curvature region when viewed along the optical axis of one microlens and has a curvature greater than the curvature of the first curvature region. The light exiting surface includes a light collecting structure configured to converge the light incident via the light incident surface. The light collecting structure overlaps with part of the first curvature region when viewed along the optical axis.

9 Claims, 12 Drawing Sheets

<IMAGE SPECIFIED BY IMAGE SIGNAL Vid-in>

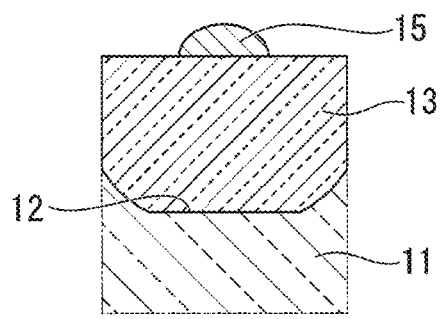
FIG. 11C
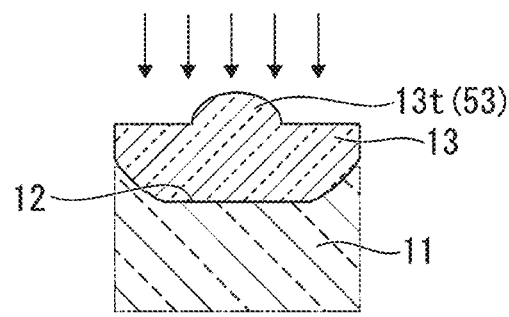
FIG. 11D
FIG. 12
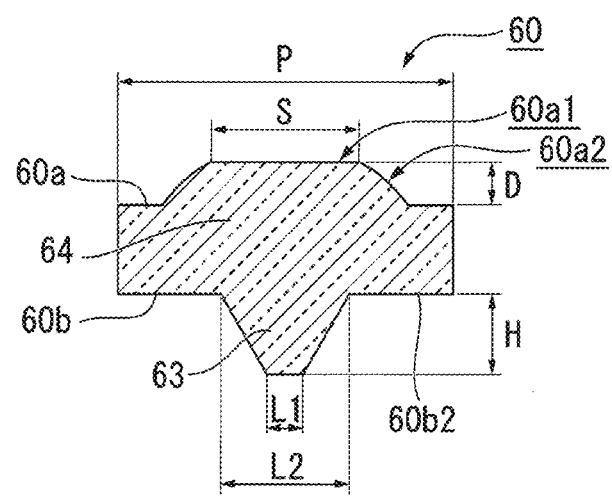

MICROLENS ARRAY SUBSTRATE, LIGHT MODULATOR, AND PROJECTOR

The present application is based on, and claims priority from JP Application Serial Number 2019-198834, filed Oct. 31, 2019, the disclosure of which is hereby incorporated by reference herein in its entirety.

BACKGROUND

1. Technical Field

The present disclosure relates to a microlens array substrate, a light modulator, and a projector.

2. Related Art

To allow a projector to display a bright image that excels in display quality, illumination light needs to be efficiently incident on an image formation region of a light modulation device in which a plurality of pixels are arranged. That is, when the illumination light is incident on a region of the image formation region that is a region that does not contribute to image light formation, for example, a region between the pixels adjacent to each other or an in-pixel region covered with a light blocking layer, the illumination light use efficiency lowers, resulting in a dark projected image. The following configuration has been employed to solve the problem described above: A microlens array in which a plurality of microlenses are two-dimensionally arranged is used to cause the illumination light to efficiently enter the opening of each of the pixels.

JP-A-2015-69187 discloses a microlens array substrate including a substrate provided with a plurality of recesses and a lens layer that fills the recesses of the substrate, the plurality of recesses each having a flat portion provided at in a central portion of the corresponding pixel, a curved portion so provided as to surround the flat portion, and a peripheral portion so provided as to surround the curved portion.

JP-A-2015-69187 describes that the microlens array substrate is so configured that the angle between the peripheral portion and a first surface of the substrate is smaller than the angle between the first surface and an imaginary curved surface that is the extension of the curved portion extending toward the first surface, and that the light incident on the flat portion therefore passes through the microlenses without undergoing refraction and enters the opening of the pixel and excessive refraction at the peripheral portion is suppressed for further improvement in the light use efficiency. The microlens array substrate disclosed in JP-A-2015-69187, however, has a problem of low efficiency at which the light is used by an optical system on the downstream of the light modulation device, for example, a projection system because the light convergence degree at the central portion of each of the pixels of the light modulation device is small even when the light is allowed to travel through the opening of the pixel, resulting in a problem of a decrease in image quality.

SUMMARY

A microlens array substrate according to an aspect of the present disclosure includes a light transmissive substrate having a first surface and a plurality of recesses corresponding to a plurality of pixels, the recesses being provided to the first surface, and a microlens array including a plurality of microlenses corresponding to the plurality of recesses, the microlens array being arranged at a first surface side. The microlenses each have a refractive index different from a refractive index of the substrate, and each have a light incident surface on which light is incident via the substrate and a light exiting surface via which the light exits. The light incident surface has a first curvature region and a second curvature region, the second curvature region surrounding the first curvature region when viewed along an optical axis of one microlens and having a curvature greater than a curvature of the first curvature region. The light exiting surface includes a light collecting structure configured to converge the light incident via the light incident surface. The light collecting structure overlaps with part of the first curvature region when viewed along the optical axis.

In the microlens array substrate according to the aspect of the present disclosure, the first curvature region may have a first flat surface perpendicular to the optical axis.

In the microlens array substrate according to the aspect of the present disclosure, the light exiting surface may have a second flat surface perpendicular to the optical axis, the second flat surface surrounding the light collecting structure when viewed along the optical axis, and the second flat surface may overlap with part of the second curvature region when viewed along the optical axis.

In the microlens array substrate according to the aspect of the present disclosure, the light collecting structure may include a protrusion protruding in a direction in which the light exits, and the protrusion may have an inclining surface inclining with respect to the optical axis.

In the microlens array substrate according to the aspect of the present disclosure, the microlenses may each be formed of a first member that forms a lens section excluding the protrusion and a second member that forms the protrusion, and a refractive index of the second member may be greater than a refractive index of the first member.

In the microlens array substrate according to the aspect of the present disclosure, the microlenses may be formed of a single member.

A light modulator according to another aspect of the present disclosure includes a device substrate, the microlens array substrate according to the aspect of the present disclosure, and an electro optical layer disposed between the device substrate and the microlens array substrate.

A projector according to another aspect of the present disclosure includes a light source apparatus, the light modulator according to the aspect of the present disclosure, modulating light emitted from the light source apparatus in accordance with image information, and a projection optical apparatus projecting the light modulated by the light modulator.

The projector according to the aspect of the present disclosure may further include a pixel shifter shifting an image formed by the light modulator on a projection receiving surface in a predetermined direction.

BRIEF DESCRIPTION OF THE DRAWINGS

FIG. 11C shows a step subsequent to the step in FIG. 11B.

FIG. 11D shows a step subsequent to the step in FIG. 11C.

FIG. 12 is a diagrammatic view of a microlens in Example employed in a simulation.

DESCRIPTION OF EXEMPLARY EMBODIMENTS

An embodiment of the present disclosure will be described below with reference to the drawings.

Figure 1:
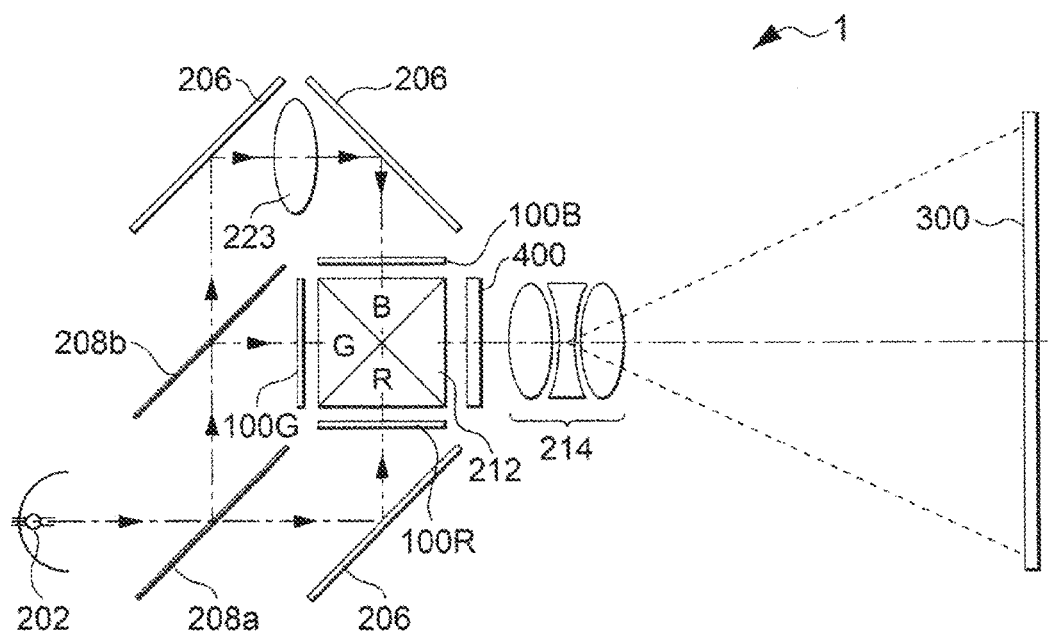
FIG. 1 is a schematic configuration diagram showing a projector according to an embodiment of the present disclosure.

FIG. 1 is a schematic configuration diagram showing the optical system of a projector according to the present embodiment.

In the following drawings, components are drawn at different dimensional scales in some cases for clarity of each of the components.

A projector 1 according to the present embodiment is what is called a three-panel projector so formed that images formed by three liquid crystal panels are combined with one another and the combined image is enlarged and projected, as shown in FIG. 1. The projector 1 includes a light source apparatus 202, light modulators 100R, 100G, and 100B, a projection optical apparatus 214, and a pixel shifter 400.

The light modulators 100R, 100G, and 100B each modulate light from the light source apparatus 202 in accordance with image information. The projection optical apparatus 214 projects the light modulated by the light modulator 100R, the light modulated by the light modulator 100G, and the light modulated by the light modulator 100B on a projection receiving surface, such as a screen 300.

The pixel shifter 400 shifts the images formed by the light modulators 100R, 100G, and 100B in a predetermined direction on the projection receiving surface, such as a screen 30.

The light source apparatus 202 formed of a lamp unit that outputs white light, such as a halogen lamp, is provided in the projector 1. The white light outputted from the light source apparatus 202 is separated by three mirrors 206 and dichroic mirrors 208a and 208b into red light (R), greenlight (G), and blue light (B), which are guided to the light modulators 100R, 100G, and 100B corresponding to the three colors.

In detail, the dichroic mirror 208a receives the white light, transmits light that belongs to a red wavelength region, and reflects light that belongs to green and blue wavelength regions. The dichroic mirror 208b receives the light that belongs to the green and blue wavelength regions and has been reflected off the dichroic mirror 208a, transmits the light that belongs to the blue wavelength region, and reflects the light that belongs to the green wavelength region. Since the optical path length of the blue light B is longer than the optical path length of the red light R and the optical path length of the green light G, a relay lens 223 for suppressing optical loss is provided in the middle of the optical path of the blue light B. The light source apparatus 202, the mirrors 206, and the dichroic mirrors 208a and 208b form an illuminator that guides color light fluxes formed of the red light R, the green light G, and the blue light B to the light modulators 100R, 100G, and 100B corresponding thereto.

The light modulators 100R, 100G, and 100B are each an electrooptical apparatus formed of a transmissive liquid crystal panel used as a light valve. The light modulator 100R corresponds to the red light R, the light modulator 100G corresponds to the green light G, and the light modulator 100B corresponds to the blue light B. In the present embodiment, the light modulators 100R, 100G, and 100B, which will be described later in detail, each have a plurality of pixels arranged in a matrix formed of 1920 columns arranged in the lateral direction and 1080 rows arranged in the longitudinal direction, and the pixels each have variable transmittance. Therefore, the light outputted from the light modulator 100R forms a red-component image, the light outputted from the light modulator 100G forms a green-component image, and the light outputted from the light modulator 100B forms a blue-component image.

The light fluxes outputted from the light modulators 100R, 100G, and 100B enter a dichroic prism 212 along three different directions. In the dichroic prism 212, the red light R and the blue light B are reflected off dichroic mirrors in the dichroic prism 212 and travel in directions that intersect the light incident directions by 90 degrees, whereas the green light G passes through the dichroic mirrors and travels straight in the same direction as the light incident direction. The images formed of the three color fluxes are thus combined with one another.

The pixel shifter 400 and the projection optical apparatus 214 are provided in this order on the light exiting side of the dichroic prism 212. The pixel shifter 400 translates in a predetermined direction the optical axis of the light that exits out thereof with respect to the optical axis of the light incident thereon to shift an image to be projected by a predetermined distance. The pixel shifter 400 may instead be, for example, a device that is formed of a parallel flat glass plate inclining with respect to the optical path of the incident light and translates the optical path of the exiting light based on refraction. The pixel shifter 400 may still instead be, for example, a device using a light transmissive medium having a refractive index changed by an electric signal.

The projection optical apparatus 214 includes a single projection lens or a plurality of projection lenses. The projection optical apparatus 214 enlarges the combined image outputted via the pixel shifter 400 and projects the enlarged image on the screen 300.

Since the dichroic mirrors 208a and 208b cause the red light R, the green light G, and the blue light B to be incident on the light modulators 100R, 100G, and 100B corresponding thereto, no color filter, such as that provided in a direct-view image display apparatus, is provided. The images having passed through the light modulators 100R and 100B are reflected off the dichroic prism 212 and then projected, whereas the image having passed through the light modulator 100G travels straight through the dichroic prism 212 and is projected. The images formed by the light modulators 100R and 100B and the image formed by the light modulator 100G are bilaterally reversed from each other.

Figure 2:
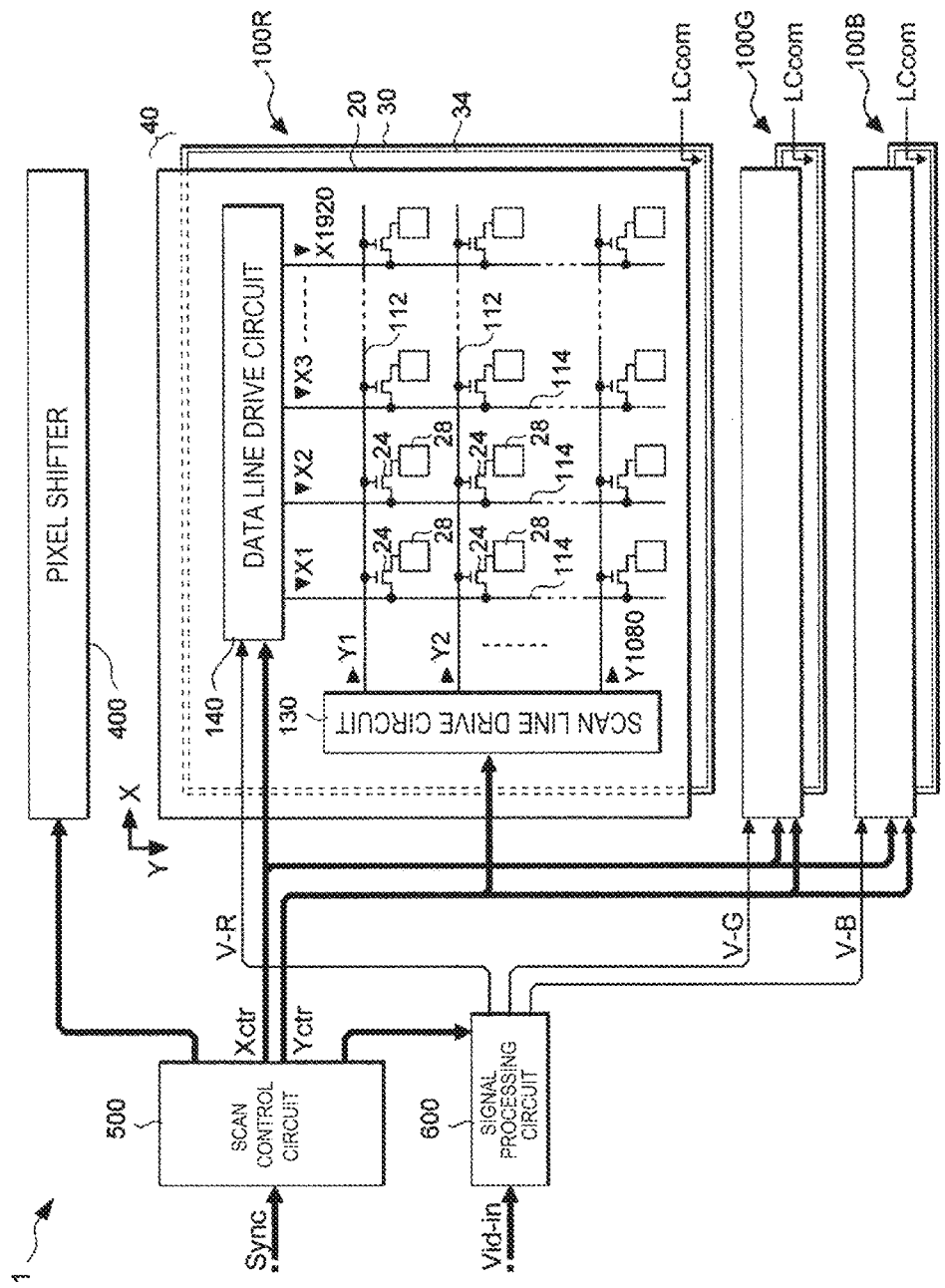
FIG. 2 is a block diagram showing the configuration of the projector.

FIG. 2 is a block diagram showing the electrical configuration of the projector 1.

The projector 1 includes the light modulators 100R, 100G, and 100B, the pixel shifter 400, a scan control circuit 500, and a signal processing circuit 600, as shown in FIG. 2. The light modulators may instead include the light modulators 100R, 100G, and 100B and have the functions of part of the scan control circuit 500 and the signal processing circuit 600.

An image signal supplier (not shown) supplies the signal processing circuit 600 with an image signal Vid-in. The image signal Vid-in is digital data that specifies a frame-based image, for example, in the form of pixels arranged in 3840 columns arranged in the lateral direction and 2160 rows arranged in the longitudinal direction and further specifies the grayscale of each pixel, for example, in the form of 8 RGB bits or 24 bits in total. The image signal Vid-in is supplied in the scan order according to a vertical scan signal, a horizontal scan signal, and a dot clock signal (none of the signals is shown) contained in a sync signal Sync. One frame period is the period for which one image is displayed and is also a vertical scan period specified by the vertical scan signal contained in the sync signal Sync. In the present embodiment, one frame period is the period for which one image, for example, having a pixel arrangement formed of 3840 columns arranged in the lateral direction and 2160 rows arranged in the longitudinal direction is displayed in a visually recognizable manner and is formed of a plurality of field periods, as will be described later.

The resolution of an image specified by the image signal Vid-in is 3840 columns arranged in the lateral direction and 2160 rows arranged in the longitudinal direction, whereas the resolution of the light modulators 100R, 100G, and 100B is 1920 columns arranged in the lateral direction and 1080 rows arranged in the longitudinal direction, which are half the longitudinal and lateral resolutions of the image specified by the image signal Vid-in. In view of the fact described above, one frame period is divided into a plurality of field periods, and an image that is the combination of the images from the light modulators 100R, 100G, and 100B is projected in odd-numbered fields with no pixel shift performed by the pixel shifter 400 but the image is projected in even-numbered fields with the pixel shift performed by the pixel shifter 400 in the present embodiment. The resolution of the light modulators 100R, 100G, and 100B is spuriously increased and thus coincides with the resolution of the image specified by the image signal Vid-in.

The scan control circuit 500 controls the light modulators 100R, 100G, and 100B, the pixel shifter 400, and the signal processing circuit 600 in synchronization with the sync signal Sync supplied from the image signal supplier. In particular, the scan control circuit 500 controls the pixel shift performed by the pixel shifter 400 in accordance with a control signal A/B. Specifically, the scan control circuit 500 controls the pixel shifter 400 in such a way that no pixel shift is performed in odd-numbered fields but the pixel shift is performed in even-numbered fields.

The signal processing circuit 600, which will be described later in detail, converts the resolution of the image signal Vid-in, supplies the light modulator 100R with a data signal V-R for odd-numbered and even-numbered fields, supplies the light modulator 100G with a data signal V-G for odd-numbered and even-numbered fields, and supplies the light modulator 100B with a data signal V-B for odd-numbered and even-numbered fields.

The light modulators 100R, 100G, and 100B have the same configuration and only differ from one another in terms of the color of the light incident thereon. The light modulator 100R will therefore be representatively described out of the light modulators 100R, 100G, and 100B.

The light modulator 100R includes a device substrate 20, a counter substrate 30, and a liquid crystal layer 40 (electrooptical layer). The device substrate 20 and the counter substrate 30, which transmit light, are so disposed as to face each other with a predetermined gap therebetween. The liquid crystal layer 40 is provided between the device substrate 20 and the counter substrate 30. The liquid crystal layer 40 is made, for example, of a vertical-alignment-type (VA-type) liquid crystal material in which the liquid crystal molecules are oriented in the direction perpendicular to the surfaces of the substrates in a state in which no electric field is present.

In FIG. 2, 1080 scan lines 112 are provided on a surface of the device substrate 20 that is the surface facing the counter substrate 30 along a direction X (lateral direction, rightward/leftward direction), whereas 1920 data lines 114 are provided on the same surface along a direction Y (longitudinal direction, upward/downward direction) with the data line 114 electrically insulated from the scan line 112. In the present embodiment, to distinguish the scan lines 112 or the pixels from one another, the scan lines 112 or the pixels are referred to as first-row, second-row, third-row, . . . , 1080-th-row scan lines 112 or pixels sequentially from above in FIG. 2 in some cases. Similarly, to distinguish the data lines 114 or the pixels from one another, the data lines 114 or the pixels are referred to as first-column, second-column, third-column, . . . , 1920-th-column data lines 114 or pixels sequentially from left in FIG. 2 in some cases.

On the device substrate 20, n-channel thin film transistors (TFTs) 24 and pixel electrodes 28, which transmit light, are provided in correspondence with the intersections of the scan lines 112 and the data lines 114. The gate electrodes of the TFTs 24 are coupled to the scan lines 112. The source electrodes of the TFTs 24 are coupled to the data lines 114. The drain electrodes of the TFTs 24 are coupled to the pixel electrodes 28.

On the other hand, a common electrode 34, which transmits light, is provided across one of the two surfaces of the counter substrate 30 that is the surface facing the device substrate 20. A drive circuit (not shown) applies a voltage LCcom to the common electrode 34.

In FIG. 2, since the counter surface of the device substrate 20 corresponds to the rear side of the plane of view, the scan lines 112, the data lines 114, the TFTs 24, and the pixel electrodes 28 provided on the counter surface should be drawn with broken lines but are drawn with solid lines for clarity.

A scan line drive circuit 130 and a data line drive circuit 140 are provided on the device substrate 20. The scan line drive circuit 130 supplies the first-row, second-row, third-row, . . . , 1080-th-row scan lines 112 with scan signals Y1, Y2, Y3, . . . , Y1080 in accordance with a control signal Yctr from the scan control circuit 500. In detail, the scan line drive circuit 130 selects the first-row, second-row, third-row, . . . , 1080-th-row scan lines 112 in this order for each field period, sets the level of the scan signal corresponding to the selected scan line at a selected voltage (level H), and sets the scan signals corresponding to the other scan lines at a non-selected level (level L).

The data line drive circuit 140 sequentially samples the data signal V-R supplied from the signal processing circuit 600 from the scan control circuit 500 into data signals X1, X2, X3, . . . , X1920 and supplies the first-column, second-column, third-column, . . . , 1920-th-column data lines 114 with the data signals X1, X2, X3, . . . , X1920 in accordance with a control signal Xctr.

In the configuration described above, when an arbitrary scan line 112 is selected by the corresponding scan signal, the voltage carried by the sampled data signal is applied to the pixel electrode 28 located on the selected scan line 112 via the data line 114 corresponding to the pixel electrode 28. The applied voltage is held by the capacitance of the pixel even after the scan line 112 is deselected. In the case of the normally black mode, when the held voltage is zero or close to zero, the liquid crystal molecules are oriented in a direction substantially perpendicular to the substrate surfaces, so that the light is substantially blocked by a polarizer (not shown) and a dark state is achieved. On the other hand, as the held voltage gradually increases from zero, the amount of light that passes through and exits out of the polarizer gradually increases because the liquid crystal molecules are oriented in an oblique direction with respect to the substrate surfaces, and a bright state is achieved.

In the light modulator 100R, the scan signal and data signal cause the voltage held between the pixel electrode 28 and the common electrode 34 to be written on a pixel basis. The light modulator 100R thus forms a red-component image. Similarly, the light modulator 100G forms a green-component image, and the light modulator 100B forms a blue-component image.

The electrical configuration of the light modulators 100R, 100G, and 100B has been described above, and the planar shape of the pixels and the planar shape of openings that are open portions of the black matrix in the plan view of the device substrate 20 and the counter substrate 30 will be described later.

Figure 3:
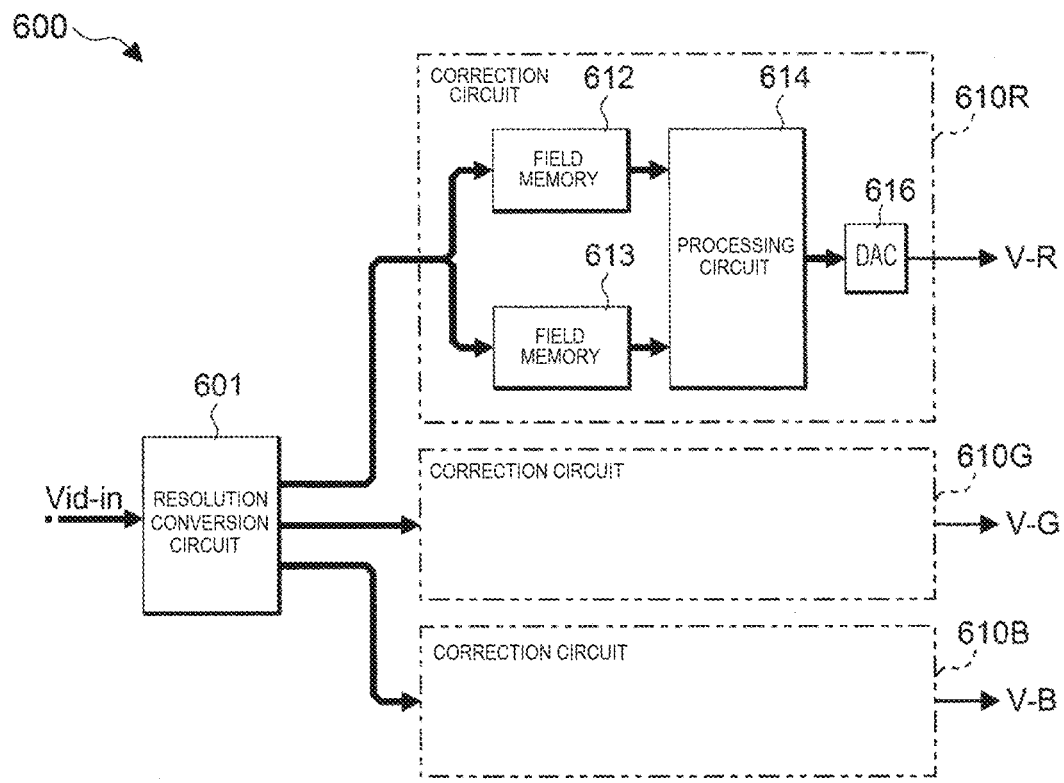
FIG. 3 is a block diagram showing the configuration of a signal processing circuit of the projector.

FIG. 3 is a block diagram showing the configuration of the signal processing circuit 600.

The signal processing circuit 600 includes a resolution conversion circuit 601 and correction circuits 610R, 610G, and 610B, as shown in FIG. 3.

The resolution conversion circuit 601 converts the high-resolution image signal Vid-in into a low-resolution image signal in accordance with the pixel configuration of the light modulators 100R, 100G, and 100B in consideration of the direction of the pixel shift performed by the pixel shifter 400. That is, the resolution conversion circuit 601 converts each frame-based image in the image signal Vid-in into an image to be displayed in the odd-numbered field and an image to be displayed in the even-numbered field with the pixels shifted for each of the light modulators 100R, 100G, and 100B.

The correction circuit 610R corrects the data signal V-R to be supplied to the light modulator 100R. The correction circuit 610G corrects the data signal V-G to be supplied to the light modulator 100G. The correction circuit 610B corrects the data signal V-B to be supplied to the light modulator 100B. The correction circuits 610R, 610G, and 610B have the same configuration, and the correction circuit 610R will therefore be representatively described.

The correction circuit 610R includes field memories 612 and 613, a processing circuit 614, and a digital-to-analog converter (DAC) 616.

The field memory 612 of the correction circuit 610R stores image data on the red component out of the converted odd-numbered-field image data from the resolution conversion circuit 601. On the other hand, when the scan control circuit 500 drives the light modulator 100R to display images in odd-numbered fields, the odd-numbered-field red-component image data is read from the field memory 612 on a pixel basis in synchronization with the vertical and horizontal scan in the driving operation described above. The field memory 613 of the correction circuit 610R stores image data on the red component out of the converted even-numbered-field image data from the resolution conversion circuit 601 under the control of the scan control circuit 500. On the other hand, when the scan control circuit 500 drives the light modulator 100R to display images in even-numbered fields, the even-numbered-field red-component image data is read from the field memory 613 on a pixel basis in synchronization with the vertical and horizontal scan in the driving operation described above.

The processing circuit 614 corrects the image data on a pixel read in synchronization with the vertical and horizontal scan when a predetermined condition is satisfied. The pixel read in synchronization with the vertical and horizontal scan is referred to as a pixel of interest. Although will be described later in detail, the processing circuit 614 corrects the image data on a pixel of interest read in the current field by referring to the image data on the pixel of interest in the preceding field and the image data on the pixels located around the pixel of interest in the current field. When the image data on the read pixel of interest does not satisfy the predetermined condition, the processing circuit 614 does not correct the image data and outputs the image data as it is.

The DAC 616 converts the red-component image data processed by the processing circuit 614 into an analog data signal V-R and supplies the light modulator 100R with the data signal V-R. For example, the DAC 616 converts the red component in the image data into a positive-polarity analog signal in odd-numbered fields and into a negative-polarity analog signal in even-numbered fields. The positive polarity and the negative polarity are terms for convenience used when the liquid crystal layer 40 is AC-driven with no DC component applied thereto. Specifically, assuming that the voltage LCcom applied to the common electrode 34 is a reference, voltages higher than the reference has the positive polarity, and voltages lower than the reference has the negative polarity.

Figure 4:
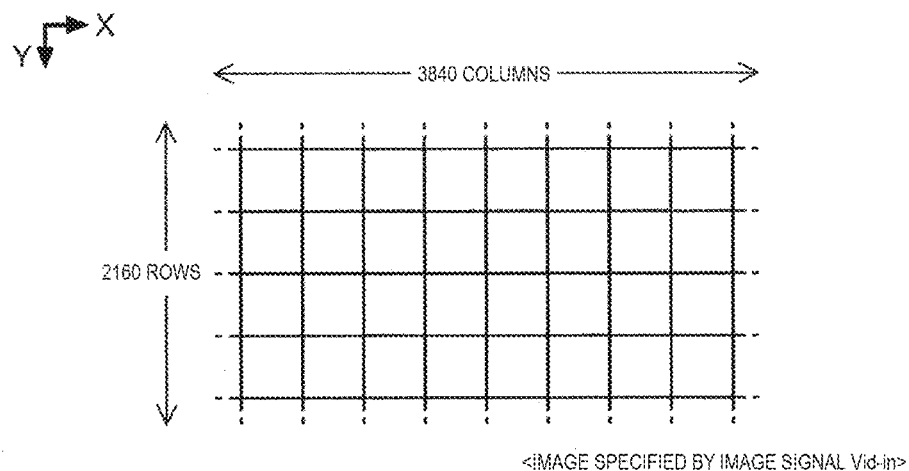
FIG. 4 shows the pixel arrangement indicted by an inputted image signal.

FIG. 4 shows part of the arrangement of the pixels that form an image specified by the image signal Vid-in.

In an image specified by the image signal Vid-in and corresponding to one frame, the pixels are arranged in a matrix in the directions X and Y, as shown in FIG. 4. In detail, the pixels are arranged in the matrix formed of 3840 columns in the direction X (lateral direction) and 2160 columns in the direction Y (longitudinal direction), as described above.

Figure 5:
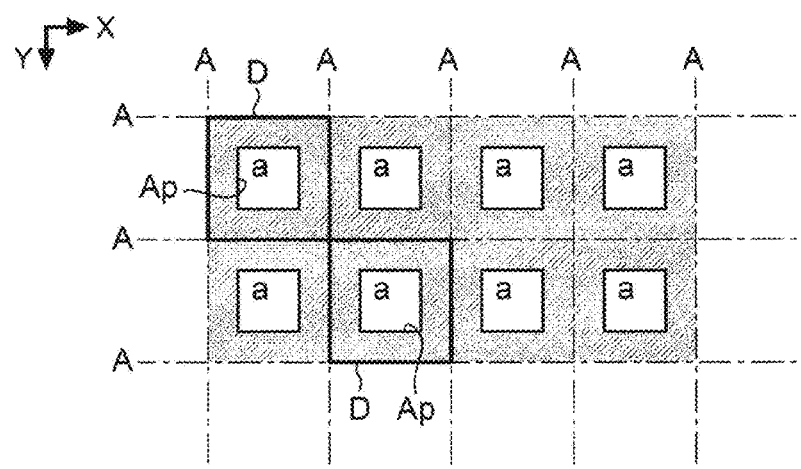
FIG. 5 shows the arrangement of a plurality of pixels in a light modulator.

FIG. 5 is a plan view showing part of the pixel arrangement in the light modulator 100R, 100G, or 100B in the plan view.

Pixels D are arranged in a matrix formed of 1920 columns arranged in the direction Y and 1080 rows arranged in the direction X. In the present embodiment, the pixels D each have a substantially square shape, and a substantially square opening Ap is provided at the pixel D, as shown in FIG. 5. The length of one edge of the opening Ap is about half the length of one edge of the pixel D. The ratio of the area of the opening Ap to the area of the pixel D, that is, the opening ratio, is therefore about 25%.

In FIG. 5, one-dot chain lines extending in the longitudinal and lateral directions represent the contours of adjacent pixels D. In the plan view, a region of the pixel D that is the region outside the opening Ap is a region where a light-blocking black matrix is provided. The black matrix can be formed, for example, by providing a thin film that blocks light on the device substrate 20 and removing the films located above the openings. In this case, the black matrix can be formed of wiring lines, such as the light-blocking scan lines 112 and data lines 114 provided on the device substrate 20, or electrodes provided thereon.

Reference characters A labeled at the ends of the extensions of the one-dot chain lines represent the reference of the pixel shift. The arrangement of the pixels D shown in FIG. 5 is the arrangement of the pixels to be projected on the screen 300 in the state in which the pixel shifter 400 performs no pixel shift. The state in which the pixel shifter 400 performs no pixel shift is called a "state A" for convenience, and the pixel visually recognized through the opening Ap of the pixel in the state A is described as a pixel a in some cases.

The pixel electrodes 28 (see FIG. 2) in the light modulator 100R, 100G, or 100B are each so formed that the shape of the pixel 28 substantially coincides with the shape of the opening Ap in a one-to-one relationship. In the present embodiment, since the light modulators operate in the normally black mode as described above, the amount of light passing through the opening Ap is small or corresponds to the dark state when the voltage held between the pixel electrode 28 located at the opening Ap and the common electrode 34 is smaller than a threshold, whereas the amount of light is large or corresponds to the bright state when the voltage is greater than the threshold.

Figure 6:
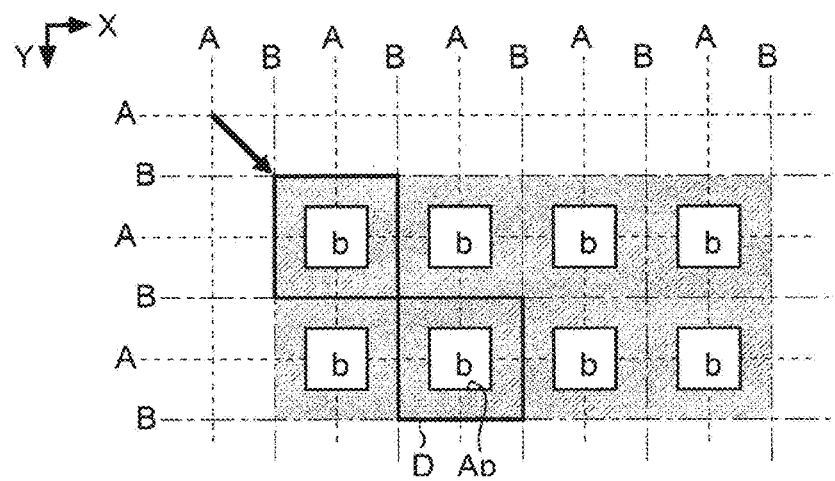
FIG. 6 shows the arrangement of the plurality of pixels in the light modulator after pixel shift.

FIG. 6 shows the arrangement of the pixels to be projected on the screen 300 in a state in which the pixel shifter 400 performs the pixel shift. The state in which the pixel shifter 400 performs the pixel shift is called a "state B" in some cases for convenience, and the pixel visually recognized through the opening Ap of the pixel in the state B is described as a pixel b in some cases.

The arrangement of the pixels b in the state B projected on the screen 300 is the arrangement shifted from the arrangement of the pixels a in the state A projected on the screen 300 by 0.5 pixel in the obliquely downward and rightward 45-degree-inclining direction, as shown in FIG. 6. The above description has been made with reference to the case where the pixels each have two positions in one axial direction and may instead the pixels each have four positions in total in two axial directions that intersect each other.

Figure 7:
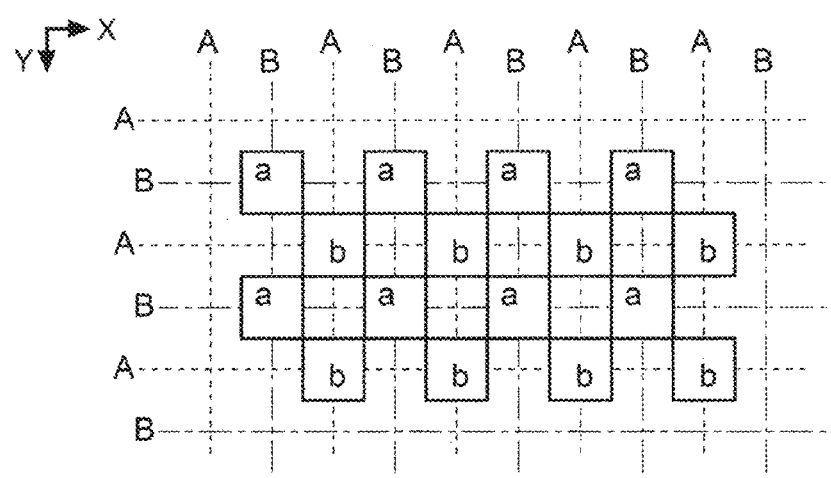
FIG. 7 describes the pixel shift performed by a pixel shifter.

When the positions of the pixels are switched from those in the state A to those in the state B at a switching frequency, a viewer visually recognizes an image formed of the pixels a in the state A and an image formed of the pixels b in the state B super imposed on each other instead of the two separate images. The arrangement of the pixels that form the image projected on the screen 300 and visually recognized by the viewer is therefore the arrangement shown in FIG. 7. In the present embodiment, the resolution of the image projected on the screen 300 is thus spuriously higher than the resolution of the light modulators 100R, 100G, and 100B.

Figure 8:
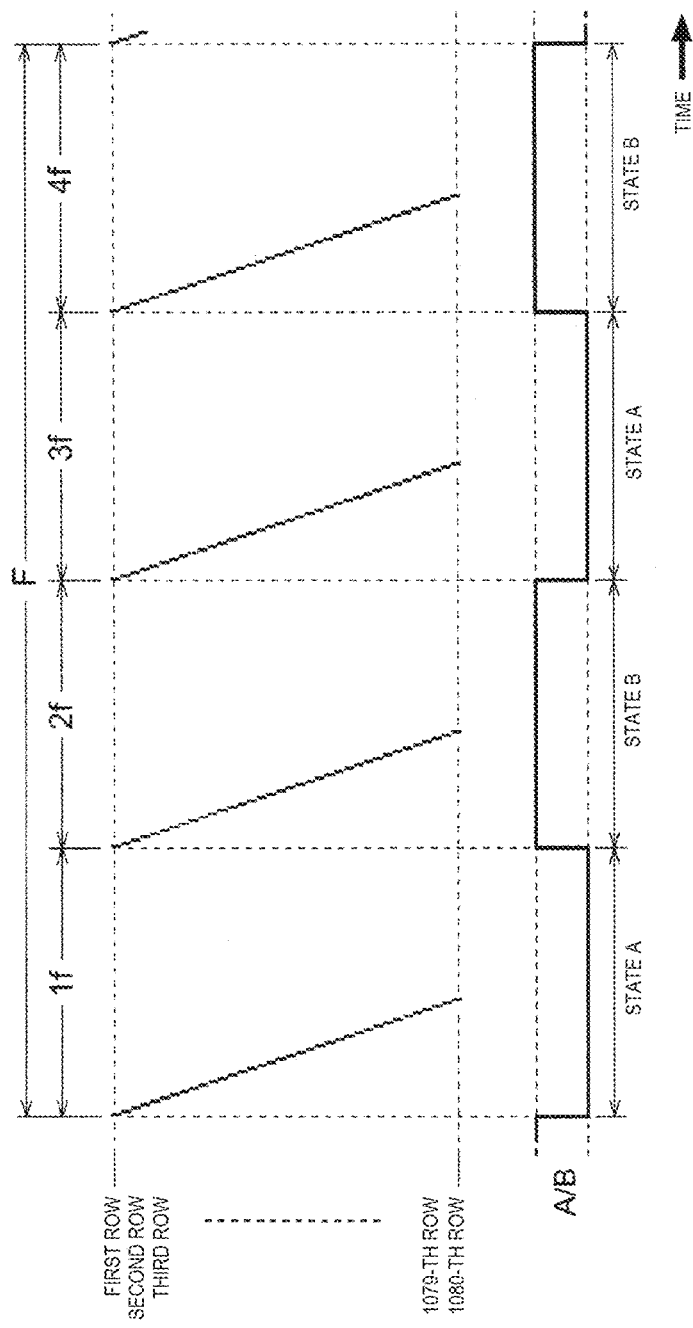
FIG. 8 is a timing chart for describing the action of the projector.

FIG. 8 is a timing chart showing an example of the action of the projector 1 and particularly shows the relationship between the row writing operation performed on the light modulators 100R, 100G, and 100B and the pixel shift performed by the pixel shifter 400.

In the example shown in FIG. 8, one frame period (F) is divided into four field periods. In detail, one frame period (F) is divided into a first field period (1$f$), a second field period (2$f$), a third field period (3$f$), and a fourth field period (4$f$). The scan control circuit 500 sets the control signal A/B at the level L in the first field period (f) and the third field period (3$f$), which are odd-numbered fields, to achieve the state A by causing the pixel shifter 400 to perform no pixel shift. On the other hand, the scan control circuit 500 sets the control signal A/B at the level H in the second field period (2$f$) and the fourth field period (4$f$), which are even-numbered fields, to achieve the state B by causing the pixel shifter 400 to perform the pixel shift.

In the light modulators 100R, 100G, and 100B, the first scan line to the 1080-th scan line are sequentially selected for each field period, and each pixel located on the selected scan line receives a data signal according to the grayscale of the pixel. The example described above corresponds to what is called fourfold-speed driving because the driving operation is performed with the one frame period (1F) divided into the four field periods.

The configuration of the light modulators 100R, 100G, and 100B will be described below in more detail.

Since the light modulators 100R, 100G, and 100B have the same configuration as described above, the light modulator 100R will be representatively described below.

Figure 9:
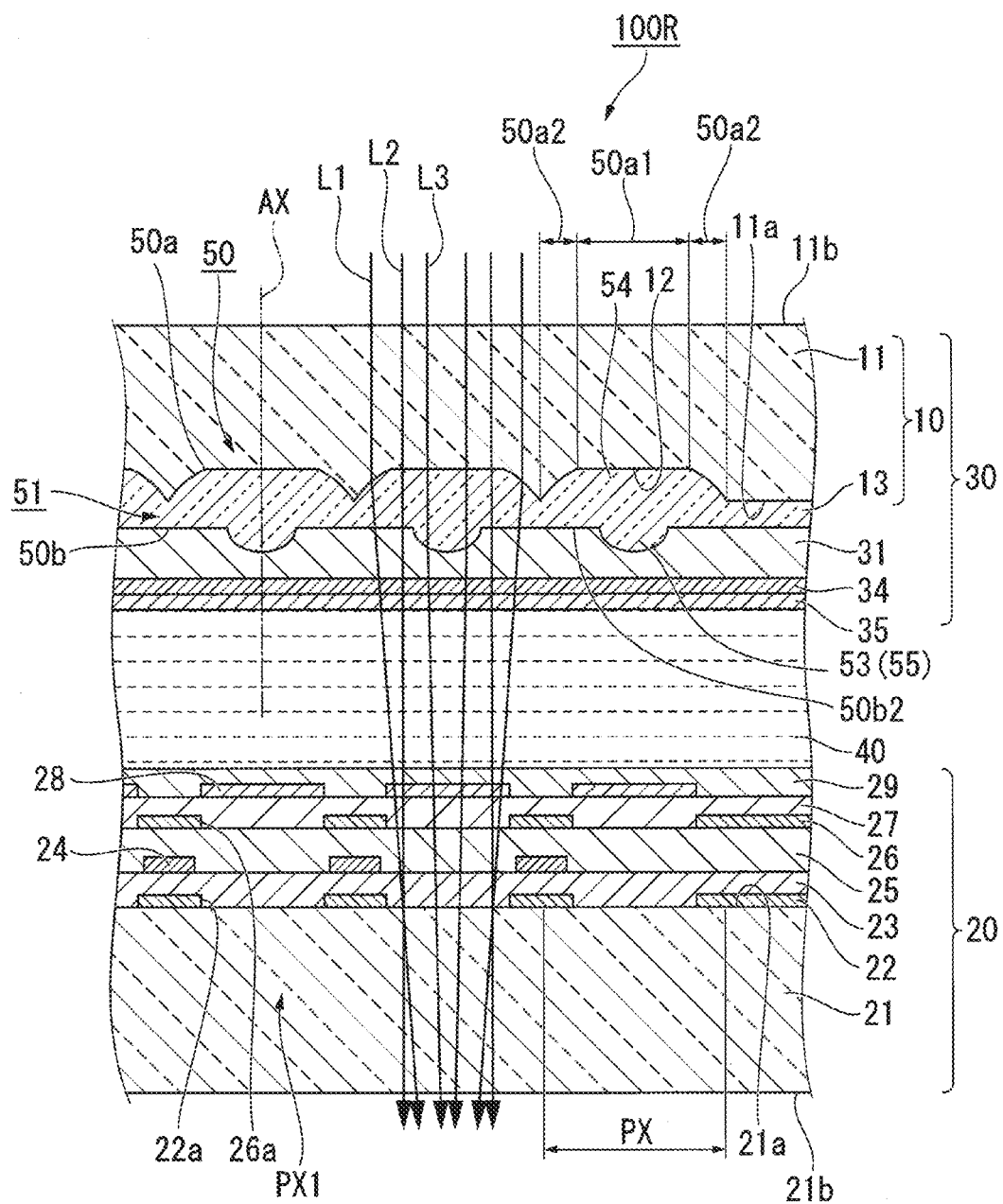
FIG. 9 is a cross-sectional view of the light modulator.

FIG. 9 is a cross-sectional view of the light modulator 100R.

The light modulator 100R includes the counter substrate 30, the device substrate 20, and the liquid crystal layer 40, as shown in FIG. 9.

The counter substrate 30 includes a microlens array substrate 10, an optical path length adjustment layer 31, the common electrode 34, and an orientation film 35.

The microlens array substrate 10 includes a substrate 11 and a microlens array 51 formed of a lens layer 13. The substrate 11 is made of an inorganic material that transmits light, for example, glass and quartz. Out of the two surfaces of the substrate 11, the surface facing the liquid crystal layer 40 is called a first surface 11$a$, and the surface different from the first surface 11$a$ is called a second surface 11$b$. The substrate 11 has a plurality of recesses 12 provided in the first surface 11$a$. The recesses 12 are provided in correspondence with pixels PX.

The recesses 12 each have a flat portion provided in a central portion of the recess 12 and a curved portion provided around the flat portion. The shape of the recesses 12 will be described later in detail.

The lens layer 13 is so provided as to cover the first surface 11$a$ of the substrate 11. The lens layer 13 is so formed as to be thicker than the depth of the recesses 12 and is therefore so provided that the lens layer 13 fills the plurality of recesses 12 and is further deposited on the first surface 11$a$ of the substrate 11. The lens layer 13$d$ is made of a material that transmits light and has a refractive index different from that of the substrate 11. More specifically, the lens layer 13 is made of an inorganic material having a refractive index greater than the refractive index of the substrate 11. Inorganic materials of this type may, for example, be SiON and $Al_2O_3$.

The constituent material of the lens layer 13 fills the recesses 12 to form microlenses 50, each of which has the shape of a convex lens. The microlenses 50 are therefore provided in correspondence with the pixels PX. The plurality of microlenses 50 arranged in an array form the microlens array 51.

The optical path length adjustment layer 31 is so provided as to cover the lens layer 13. The optical path length adjustment layer 31 is made, for example, of an inorganic material that transmits light and has substantially the same refractive index as the refractive index of the substrate 11. An inorganic material of this type may, for example, be $SiO_2$. The optical path length adjustment layer 31 has the function of adjusting the distance from the microlenses 50 to a first light blocking layer 22 and a second light blocking layer 26 above the device substrate 20, that is, the optical path length of the light having exited out of the microlenses 50 to a desired value. The layer thickness of the optical path length adjustment layer 31 is therefore set as appropriate based on the optical conditions, such as the focal length of the microlenses 50 according to the wavelength of the light.

The common electrode 34 is so provided as to cover the optical path length adjustment layer 31. The common electrode 34 is so formed as to extend over the plurality of pixels PX. The common electrode 34 is formed of a transparent electrically conductive film made, for example, of an indium tin oxide (ITO) or an indium zinc oxide (IZO). The orientation film 35 is so provided as to cover the common electrode 34.

The device substrate 20 includes a substrate 21, the first light blocking layer 22, a first insulating layer 23, the TFTs 24, a second insulating layer 25, the second light blocking layer 26, a third insulating layer 27, the pixel electrodes 28, and an orientation film 29.

The substrate 21 has a first surface 21a, which faces the liquid crystal layer 40, and a second surface 21b, which differs from the first surface 21a. The substrate 21 is made of a light transmissive material, for example, glass and quartz. The first light blocking layer 22 is provided on the first surface 21a of the substrate 21. The first light blocking layer 22 is provided in the form of a lattice when viewed along the direction of a normal to the first surface 21a.

The first insulating layer 23 is so provided as to cover the first surface 21a of the substrate 21 and the first light blocking layer 22. The first insulating layer 23 is made of an inorganic material, for example, $SiO_2$.

The TFTs 24 are provided on the first insulating layer 23. The TFTs 24 are each a switching device that drives the corresponding pixel electrode 28. The TFTs 24 are each formed of a semiconductor layer, a gate electrode, a source electrode, and a drain electrode, none of which is shown. A source region, a channel region, and a drain region are formed in the semiconductor layer. A lightly doped drain (LDD) region may be formed along the interface between the channel region and the source region or between the channel region and the drain region.

The gate electrode is formed in a region of the device substrate 20 that is a region where the gate electrode overlaps with the channel region of the semiconductor layer in the plane view and formed via a portion of the second insulating layer 25. That is, the portion of the second insulating layer 25, which is provided in the region where the portion overlaps with the channel region of the semiconductor layer, functions as a gate insulating film. Although not shown, the gate electrode is electrically coupled to the corresponding scan line 112 via a contact hole and turns on and off the TFT 24 when the scan signal is applied to the gate electrode.

The second insulating layer 25 is so provided as to cover the first insulating layer 23 and the TFTs 24. The second insulating layer 25 is made of an inorganic material, for example, $SiO_2$. The second insulating layer 25 includes the gate insulating films that insulate the semiconductor layers of the TFTs 24 from the gate electrodes thereof. The second insulating layer 25 further has the function of lessening the irregularities of the surface of the device substrate 20 that result from the TFTs 24.

The second light blocking layer 26 is provided on the second insulating layer 25. The third insulating layer 27 is so provided as to cover the second insulating layer 25 and the second light blocking layer 26. The third insulating layer 27 is made of an inorganic material, for example, $SiO_2$.

The first light blocking layer 22 and the second light blocking layer 26 are so provided as to sandwich the TFTs 24 in the thickness direction of the device substrate 20 (direction Z). The first light blocking layer 22 overlaps with at least the channel regions of the TFTs 24 in the plan view. Providing the first light blocking layer 22 and the second light blocking layer 26 suppresses incidence of the light on the TFT 24. Openings 22a of the first light blocking layer 22 and openings 26a of the second light blocking layer 26 coincide with each other in the plan view and form regions that transmit light. Therefore, in each of the pixels PX, the region where the openings 22a and 26a coincide with each other in the plane view is called an opening region PX1 of the pixel PX.

The pixel electrodes 28 are provided on the third insulating layer 27 in correspondence with the pixels PX. The pixel electrodes 28 are provided in the regions where the openings 22a of the first light blocking layer 22 and the openings 26a of the second light blocking layer 26 coincide with each other in the plan view. The pixel electrodes 28 are each formed of a transparent electrically conductive film made, for example, of ITO or IZO.

The orientation film 29 is so provided as to cover the pixel electrodes 28 and the third insulating layer 27. The liquid crystal layer 40 is encapsulated between the orientation film 29 of the device substrate 20 and the orientation film 35 of the counter substrate 30.

The TFTs 24 and electrodes, wiring lines, and other components (not shown) that supply the TFTs 24 with electric signals are provided in the region where the first light blocking layer 22 and the second light blocking layer 26 coincide with each other in the plan view. The electrodes, wiring lines, and other components may instead further serve as the first light blocking layer 22 and the second light blocking layer 26.

The light outputted from the light source apparatus 202 enters the light modulator 100R in the present embodiment via the counter substrate 30 including the microlens array 51, and the microlenses 50 causes the light to converge. The convergent light passes through the liquid crystal layer 40, passes the openings 22a of the first light blocking layer 22 and the openings 26a of the second light blocking layer 26, and exits out of the device substrate 20.

The microlenses 50, which form the microlens array 51, will be described below.

The microlenses 50 are provided in correspondence with the plurality of recesses 12 of the substrate 11 and made of a material having a refractive index different from the refractive index of the substrate 11, as described above. The microlenses 50 are each formed of a light collecting structure 53 and a lens section 54 integrated with each other. That is, the microlenses 50 are formed of a single member. Portions of the microlenses 50 that are the portions excluding the light collecting structures 53, which will be described later, are referred to as the lens sections 54.

The microlenses 50 each have a light incident surfaces 50a, on which the light is incident via the substrate 11, and a light exiting surface 50b, via which the light exits. A straight line passing through the center of a microlens 50 and being perpendicular to the second surface 11b of the substrate 11 is hereinafter defined below as an optical axis AX of the microlens 50. Viewing each member along the direction of the optical axis AX is hereinafter referred to as a plan view.

The light incident surface 50a has a first flat region 50a1 (first curvature region) and an inclining region 50a2 (second curvature region). The first flat region 50a1 has a first flat surface provided around the optical axis AX and being perpendicular to the optical axis AX. That is, the curvature of the first flat region 50a1 is zero. In contrast, the inclining region 50a2 is so provided as to surround the first flat region 50a1 in the plan view and has a curvature greater than the curvature of the first flat region 50a1. In the present embodiment, a central portion of the light incident surface 50a is a flat surface, and the central portion of the light incident surface 50a is not necessarily a flat surface perpendicular to the optical axis and may instead be a curved surface. In this case, the curvature of the curved surface is desirably smaller than the curvature of the inclining region 50a2.

The light exiting surface 50b has a light collecting structure 53, which causes the light incident via the light incident surface 50a to converge, and a second flat region 50b2. The light collecting structure 53 is formed of a protrusion 55, which protrudes in the light exiting direction. The cross-sectional shape of the protrusion 55 taken along a plane perpendicular to the light incident surface 50a and the light exiting surface 50b is, for example, an elliptical shape or a polygonal pyramidal shape. The protrusion 55 therefore has an inclining surface inclining with respect to the optical axis AX and formed of a curved surface or a flat surface. The second flat region 50b2 is formed of a second flat surface so provided as to surround the light collecting structure 53 and being perpendicular to the optical axis AX.

Figure 10:
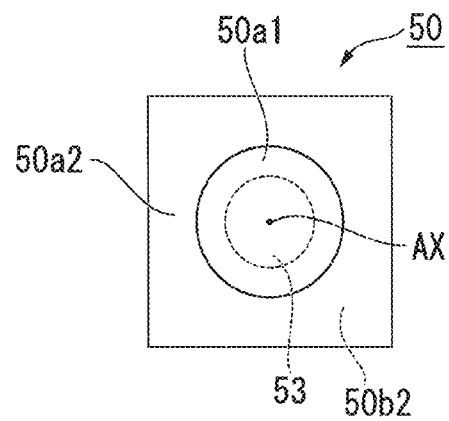
FIG. 10 is a plan view of a microlens.

FIG. 10 is a plan view showing a microlens 50 viewed along the optical axis AX from the side facing the second surface 11b of the substrate 11.

The light collecting structure 53 does not entirely coincide with the first flat region 50a1 of the light incident surface 50a but coincides with part of the first flat region 50a1, specifically, a central portion of the first flat region 50a1 in the plan view, as shown in FIG. 10. In other words, the central portion of the first flat region 50a1 coincides with the light collecting structure 53 in the plan view, but the peripheral portion of the first flat region 50a1 does not overlap with the light collecting structure 53 in the plan view. The second flat surface that forms the second flat region 50b2 is a surface perpendicular to the optical axis AX and parallel to the first flat surface, as shown in FIG. 9. The second flat region 50b2 is so provided as to surround the light collecting structure 53 and overlaps with part of the inclining region 50a2 of the light incident surface 50a in the plan view.

A method for manufacturing the microlens array substrate 10 will be described below.

FIGS. 11A to 11D sequentially show the steps of manufacturing the microlens array substrate 10.

The substrate 11 made, for example, of glass or quartz is first provided, and the recesses 12 are formed in the substrate 11 by isotropic etching using a mask layer that is not shown. At this point, an etching control film that is not shown is formed below the mask layer, and the etching control film is used to control the etching rate in the in-plane direction rather than the thickness direction of the substrate. The recesses 12 each having a substantially flat bottom can thus be formed. The mask layer and the etching control film are then removed.

Figure 11A:
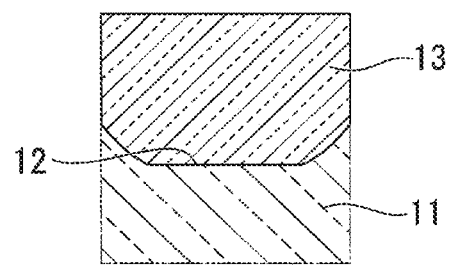
FIG. 11A shows the step of manufacturing a microlens array substrate.

An inorganic material having a refractive index greater than that of the substrate 11, such as SiON and $Al_2O_3$, is then so deposited as to cover the first surface of the substrate 11 including the interior of the recesses 12 to form the lens layer 13, as shown in FIG. 11A. At this point, irregularities that reflect the recesses 12 of the substrate 11 are formed along the upper surface of the lens layer 13. A planarization process, such as chemical mechanical polishing (CMP), is therefore performed on the upper surface of the lens layer 13 to planarize the upper surface of the lens layer 13.

Figure 11B:
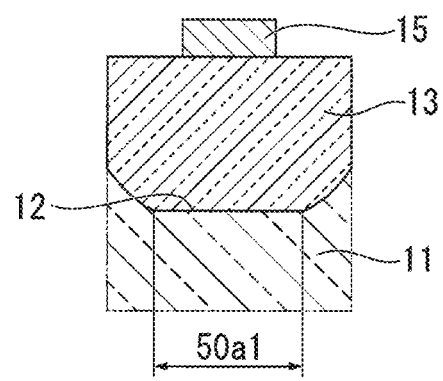
FIG. 11B shows a step subsequent to the step in FIG. 11A.

A resist pattern 15 is then formed on the upper surface on the lens layer 13, as shown in FIG. 11B. At this point, the resist pattern 15 is so positioned as to be located above the central portion of the first flat region 50a1 of the lens layer 13.

The resist pattern 15 is then reflowed in a heating process, as shown in FIG. 11C. Immediately after the resist pattern 15 is formed, the cross-sectional shape of the resist pattern 15 has sharp corners. The following reflowing chamfers the corners of the resist pattern 15, so that the resist pattern 15 has an elliptical cross-sectional shape having a gently curved surface.

The shape of the resist pattern 15 is then transferred to the upper surface of the lens layer 13 in a dry etching process, as shown in FIG. 11D. At this point, since the upper surface of the lens layer 13 is etched, and so is the resist pattern 15 in such a way that the surface of the resist pattern gradually scraped. A protrusion 13t, which reflects the shape of the resist pattern 15, is thus formed on the upper surface of the lens layer 13. That is, the protrusion 13t has an elliptical cross-sectional shape. The thus formed protrusion 13t forms the light collecting structure 53 described above.

The microlens array substrate 10 is formed by carrying out the steps described above. The optical path length adjustment layer 31, the common electrode 34, and the orientation film 35 are then sequentially so formed as to cover the microlens array 51. The counter substrate 30 in the present embodiment is thus completed.

In the present embodiment, the protrusion 13t has an elliptical cross-sectional shape, but not necessarily, and may have, for example, a circular or trapezoidal cross-sectional shape. Further, the bottom of the protrusion 13t may have a circular shape, a quadrangular shape, or any other shape. The method for forming the resist pattern 15 is not limited to reflowing, and a resist pattern 15 having an inclining surface may instead be formed by light exposure using a grating mask, multi-stage light exposure, or any other method. Still instead, the light collecting structure 53 may have a structure including a protrusion having a high central portion and a low peripheral portion and cut in the radial direction or what is called the Fresnel lens structure.

In the microlens array substrate 10 according to the present embodiment, appropriately setting the curvature of the inclining region 50a2 and the light collecting structure 53 of each of the microlenses 50 adjusts the refracting power of the lens section 54 and the light collecting structure 53. As a result, light L1 incident on the inclining region 50a2 of the light incident surface 50a of each of the microlenses 50 is refracted at the light incident surface 50a and passes through the opening region PX1 of the device substrate 20, as shown in FIG. 9. Further, out of the light incident on the first flat region 50a1, light L2 incident on the positions that do not fall within the light collecting structure 53 but fall within the second flat region 50b2 is not refracted at the light incident surface 50a or the light exiting surface 50b and passes through the opening region PX1 of the device substrate 20. Moreover, out of the light incident on the first flat region 50a1, light L3 incident on the positions that fall within the light collecting structure 53 is refracted at the light exiting surface of the light collecting structure 53 and passes through the opening region PX1 of the device substrate 20. As a result, the microlens array substrate 10 according to the present embodiment increases the ratio of the light convergent into a spot at the center of the pixel PX to the light incident on the light incident surface 50a of each of the microlenses 50.

As described above, the microlens array substrate 10 according to the present embodiment, in which the light collecting structure 53 is provided at the light exiting surface 50b of each of the microlenses 50, allows the light collecting structure 53 to cause the light incident on the central portion of the first flat region 50a1 to converge into spot at the center of the pixel PX. The degree of convergence of the light into a spot at the central portion of a pixel can thus be increased, as compared with a case using the related-art microlenses each having a flat region provided at the light incident surface but having no light collecting structure.

Since only the central portion of the first flat region 50a1 overlaps with the light collecting structure 53, and the periphery of the first flat region 50a1 overlaps with the second flat region 50b2 in the plan view, a situation in which the light is excessively deflected can be avoided. Further, since the inclining region 50a2 overlaps with the second flat region 50b2 in the plan view, the situation in which the light is excessively deflected can be avoided. As a result, the amount of light passing through an opening on the downstream of the microlens array substrate 10 can be sufficiently provided with the degree of convergence of the light into a spot at the central portion of a pixel increased, whereby the light use efficiency can be maintained. Since the proportion of the light passing through disclination that occurs in the vicinity of the boundary of the pixel PX decreases as a result of the convergence of the light into a spot at the central portion of the pixel PX, the light use efficiency can be increase also from the viewpoint of reduction in the optical loss at a light-exiting-side polarizer.

In the present embodiment, in particular, since the lens section 54 and the light collecting structure 53 are integrated with each other, the constituent material of the light collecting structure 53 does not newly need to be deposited after the lens section 54 is formed, as clearly shown from the description of the manufacturing method. An increase in burden on the manufacturing process can thus be suppressed. The thickness of the optical path length adjustment layer 31 does not need to be greatly changed even in the configuration including the light collecting structures 53, as compared with the related-art configuration including no light collecting structure 53. The total thickness of the microlens array substrate 10 does not therefore increase, whereby the possibility of warpage of the substrate due to an increase in film stress, cracks in the films, and other problems decreases. As a result, a decrease in yield of the microlens array substrate 10 can be suppressed.

In the projector 1 according to the present embodiment, which uses the light modulators 100R, 100G, and 100B, which each allow a high degree of light convergence at the central portion of each pixel, a phenomenon in which adjacent pixels overlap with each other in different fields can be suppressed when the pixel shift driving operation is performed. As a result, a decrease in the sense of image resolution is suppressed, whereby an image having high display quality is produced.

According to the present embodiment, increasing the degree of light convergence at the central portion of each pixel allows an increase in transmittance provided by the light modulators 100R, 100G, and 100B, whereby heat generated by the light modulators 100R, 100G, and 100B resulting from truncation of the light at the opening regions PX1 of the device substrate 20 can be prevented. As a result, the temperature of the light modulators 100R, 100G, and 100B can be lowered, whereby the reliability of the light modulators 100R, 100G, and 100B can be improved, and reduction in the size and the number of cooling-related parts of the projector 1 allows reduction in size and cost of the projector 1.

The present inventors have carried out a simulation to demonstrate the effects of the microlens array substrate according to the present embodiment.

FIG. 12 is a diagrammatic view of a microlens in Example used in the simulation.

A microlens 60 in Example has a light incident surface 60a having a first flat region 60a1 and an inclining region 60a2 and a light exiting surface 60b having a light collecting structure 63 and a second flat region 60b2, as shown in FIG. 12. In the simulation, the light collecting structure 63 had a quadrangular pyramidal shape, unlike in the embodiment described above and. A lens section 64 and the light collecting structure 63 were integrated with each other into a single member. Design parameters were set as follows: The interval between the pixels was P; the area of the first flat region 60a1 of the lens section 64 was S; the height of the lens section 64 was D; the length of the upper base of the trapezoid that is the cross-sectional shape of the light collecting structure 63 was L1; the length of the lower base of the trapezoid was L2; and the height of the trapezoid was H. [Table 1] below shows the thus set design parameters.

In contrast, a microlens including no light collecting structure was assumed to be the microlens of the related art. The microlens of the related art was also set to have the same design parameters of the microlens portions as those of the microlens of Example except that no light collecting structure is provided.

TABLE 1

| | | Unit | Example | Related art |
|---|---|---|---|---|
| Pixel interval P | | μm | 15.6 | 15.6 |
| Lens section | Refractive index | — | 1.57 | 1.57 |
| | Area S of first flat region | μm² | 8.0 | 8.0 |
| | Height D | μm | 3.7 | 3.7 |
| Light collecting structure | Length L1 of upper base | μm | 1.6 | — |
| | Length L2 of lower base | μm | 14.0 | — |
| | Height H | μm | 5.0 | — |
| Optical path length adjustment layer | Refractive index | — | 1.5 | 1.5 |
| | Thickness | μm | 9 | 9 |

Figure 13:
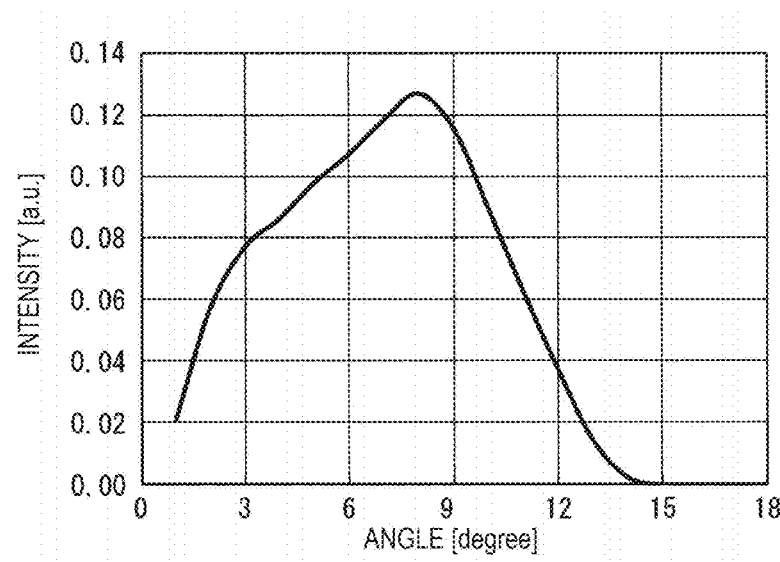
FIG. 13 shows the intensity distribution of incident light in the simulation.

FIG. 13 shows the intensity distribution of the light incident on the microlenses of Example and the related art. In FIG. 13, the horizontal axis represents the angle (degree), and the vertical axis represents the intensity (a.u.).

Light use efficiency and a light collection ratio were selected as items evaluated in the simulation. The light use efficiency was defined as the ratio of the average of the intensities of the light having reached the screen at nine points on the surface of the screen to the intensity of the light incident on the microlens 60. The light collection ratio was defined as the ratio of the light convergent into a square region of the central portion of the pixel that is a region corresponding to 31.6% of the total area of the pixel to the light that contributes to the light use efficiency. [Table 2] shows the results of the simulation.

TABLE 2

|  | Unit | Example | Related art |
| --- | --- | --- | --- |
| Light use efficiency | % | 93.1 | 95.3 |
| Light collection ratio | % | 56.5 | 44.9 |

The microlens of the related art provides a light use efficiency of 95.3%, whereas the microlens of Example provides 93.1%, as shown in Table 2, indicating a slight decrease from the value in the related art. The present inventors speculate that the slight decrease in the light use efficiency in Example from that in the related art results from an increase in truncation in the projection system due to the refraction of the light at the light collecting structure and believe that a decrease of about 2% in the light use efficiency is acceptable. In contrast, the microlens of the relate art provides a light collection ratio of 44.9%, whereas the microlens of Example provides a light collection ratio of 56.5%, which is much higher than that in the related art.

Figure 14:
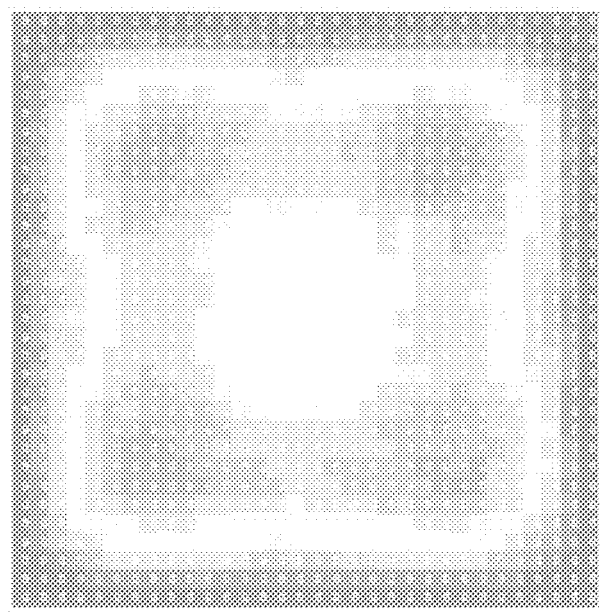
FIG. 14 shows the intensity distribution of light having passed through a device substrate in a light modulator in Comparative Example.
Figure 15:
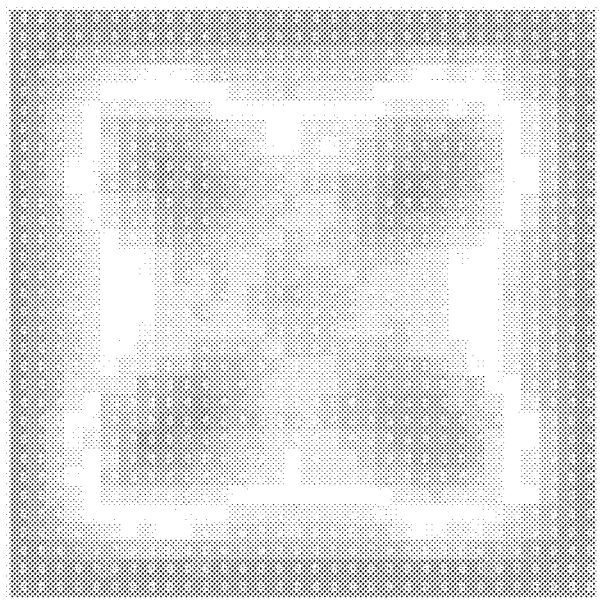
FIG. 15 shows the intensity distribution of light having passed through a device substrate in a light modulator in Example.

FIG. 14 shows the intensity distribution of the light having passed through the device substrate in a liquid crystal panel in the related art. FIG. 15 shows the intensity distribution of the light having passed through the device substrate in a liquid crystal panel in Example. FIGS. 14 and 15 show the intensity distributions in one pixel, and each location in black represents a high-intensity region.

In the case of the microlens of the related art, the intensity at the central portion of a pixel is greatly smaller than the intensity at the periphery of the pixel, as shown in FIG. 14. In contrast, in the case of the microlens of Example, the effect of the light collecting structure increases the intensity in the central portion of the pixel in addition to the high intensity at the periphery of the pixel, as shown in FIG. 15.

Assume that a projector provided with a liquid crystal panel including one of the microlens array substrates described above and a projector provided with a liquid crystal panel including the other microlens array substrate described above, and a simulation was carried out on the intensity of the light having passed through a plurality of pixels having undergone the pixel shift driving operation. The results of the simulation are shown below.

Figure 16:
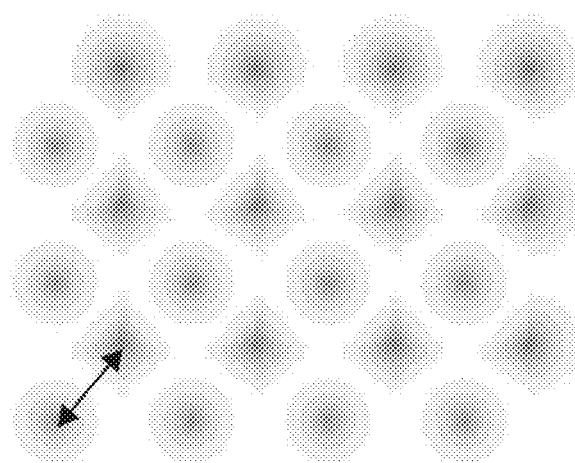
FIG. 16 shows light overlapping resulting from the pixel shift when the light modulator of Comparative Example is used.
Figure 17:
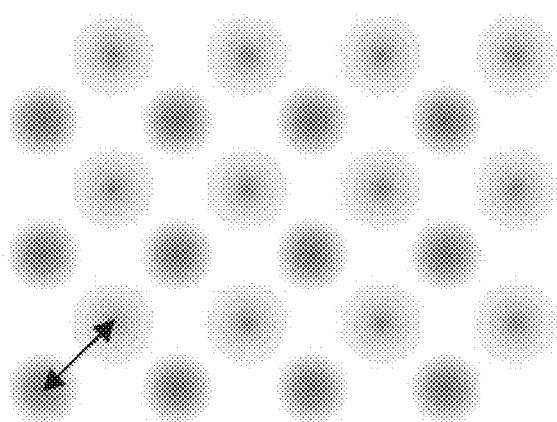
FIG. 17 shows light overlapping resulting from the pixel shift when the light modulator of Example is used.

FIG. 16 shows light overlapping resulting from the pixel shift when the liquid crystal panel of the related art is used. FIG. 17 shows light overlapping resulting from the pixel shift when the liquid crystal panel of Example is used. FIGS. 16 and 17 each show a state in which the pixel shift is performed in two fields in the arrow-indicated direction of a diagonal of square pixels.

In the case where the liquid crystal panel of the related art is used, the sense of resolution of an image deteriorates in some cases as a result of the inter-field light overlapping in the pixel shift driving operation, as shown in FIG. 16. Further, the display quality lowers in some cases as a result of inter-field color mixture. In contrast, when the liquid crystal panel of Example is used, the amount of inter-field light overlapping in the pixel shift driving operation decreases, and it is therefore demonstrated that the sense of resolution of an image can be enhanced. Further, the amount of the inter-field color mixture decreases, whereby the display quality can be improved as compared with that in Comparative Example.

The technical range of the present disclosure is not limited to that described in the above embodiment, and a variety of changes can be made to the embodiment to the extent that the changes do not depart from the substance of the present disclosure.

In the embodiment described above, for example, the lens section and the light collecting structure of each of the microlenses are integrated with each other. In please of the configuration described above, the microlenses may each be formed of a first member that forms the lens section and a second member that forms the protrusion of the light collecting structure.

Further, in this case, the refractive index of the second member may be greater than the refractive index of the first member. According to the configuration described above, the refracting power of the light collecting structure can be increased as compared with a case where the refractive index of the second member is equal to the refractive index of the first member, whereby the light collecting structure can have a gentle inclining surface, and the height of the protrusion can be reduced. As a result, the film that forms the protrusion can be a thin film, and the amount of etching can therefore be reduced, whereby the burden on the manufacturing process can be reduced.

The projector according to the embodiment described above is a projector having the pixel shift function and therefore preferably uses the light modulator including the microlens array substrate according to the present disclosure, and the present disclosure may be applied to a projector having no pixel shift function. Further, in the embodiment described above, a projector including three light modulators corresponding to red light, green light, and blue light or what is called a three-panel projector has been presented by way of example, and the present disclosure may be applied to a projector including one light modulator or what is called a single-panel projector. In the embodiment described above, a projector including a lamp unit as the light source apparatus has been presented by way of example, and the present disclosure may be applied to a projector provided with a light source apparatus including a laser light source or a laser light source and a wavelength converter.

In addition to the above, the shape, the number, the arrangement, the material, and other specific descriptions of the components of the microlens array substrate, the light modulator, and the projector are not limited to those in the embodiment described above and can be changed as appropriate.

What is claimed is:
1. A microlens array substrate comprising:
   a light transmissive substrate having a first surface and a plurality of recesses corresponding to a plurality of pixels, the recesses being provided to the first surface; and
   a microlens array including a plurality of microlenses corresponding to the plurality of recesses, the microlens array being arranged at a first surface side,
   wherein the microlenses each have a refractive index different from a refractive index of the substrate and each have a light incident surface on which light is incident via the substrate and a light exiting surface via which the light exits, the light incident surface has a first curvature region and a second curvature region, the second curvature region surrounding the first curvature region when viewed along an optical axis of one microlens and having a curvature greater than a curvature of the first curvature region, the light exiting surface includes a light collecting structure configured to converge the light incident via the light incident surface, and the light collecting structure overlaps with part of the first curvature region when viewed along the optical axis.

2. The microlens array substrate according to claim 1, wherein the first curvature region has a first flat surface perpendicular to the optical axis.

3. The microlens array substrate according to claim 1, wherein the light exiting surface has a second flat surface perpendicular to the optical axis, the second flat surface surrounding the light collecting structure when viewed along the optical axis, and the second flat surface overlaps with part of the second curvature region when viewed along the optical axis.

4. The microlens array substrate according to claim 1, wherein the light collecting structure includes a protrusion protruding in a direction in which the light exits, and the protrusion has an inclining surface inclining with respect to the optical axis.

5. The microlens array substrate according to claim 4, wherein the microlenses are each formed of a first member that forms a lens section excluding the protrusion and a second member that forms the protrusion, and a refractive index of the second member is greater than a refractive index of the first member.

6. The microlens array substrate according to claim 1, wherein the microlenses are formed of a single member.

7. A light modulator comprising:

a device substrate;

the microlens array substrate according to claim 1; and an electrooptical layer disposed between the device substrate and the microlens array substrate.

8. A projector comprising:

a light source apparatus;

the light modulator according to claim 7, modulating light emitted from the light source apparatus in accordance with image information; and a projection optical apparatus projecting the light modulated by the light modulator.

9. The projector according to claim 8, further comprising a pixel shifter shifting an image formed by the light modulator on a projection receiving surface in a predetermined direction.

* * * * *